US008730531B2

(12) United States Patent
Lee

(10) Patent No.: US 8,730,531 B2
(45) Date of Patent: May 20, 2014

(54) AUTOMATIC DOCUMENT FEEDING SCANNING DEVICE

(71) Applicant: Primax Electronics Ltd., Taipei (TW)

(72) Inventor: Chun-Yu Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/760,935

(22) Filed: Feb. 6, 2013

(65) Prior Publication Data

US 2014/0092447 A1 Apr. 3, 2014

(30) Foreign Application Priority Data

Sep. 28, 2012 (TW) .............................. 101135809 A

(51) Int. Cl.
*H04N 1/04* (2006.01)
(52) U.S. Cl.
USPC ........... 358/474; 358/496; 358/497; 358/498; 358/486
(58) Field of Classification Search
CPC ....... H04N 1/193; H04N 1/12; H04N 1/0057; H04N 1/121; H04N 2201/00631; H04N 1/1017; H04N 1/1013; H04N 2201/1016; H04N 2201/0425
USPC ......... 358/496, 497, 498, 486, 474, 401, 501, 358/505; 399/367, 379, 211; 318/685, 696
See application file for complete search history.

(56) References Cited

U.S. PATENT DOCUMENTS

| 5,226,639 | A | * | 7/1993 | Kida et al. ................... 271/109 |
| 5,523,858 | A | * | 6/1996 | Yamada et al. ............... 358/412 |
| 5,854,696 | A | * | 12/1998 | Yun ............................... 358/498 |
| 5,862,446 | A | * | 1/1999 | Hashizume et al. .......... 399/367 |
| 6,019,363 | A | * | 2/2000 | Ahn ........................... 271/10.05 |
| 6,765,698 | B1 | * | 7/2004 | Ha ................................ 358/474 |
| 6,948,871 | B1 | * | 9/2005 | Onishi et al. ................. 400/679 |
| 6,982,815 | B2 | * | 1/2006 | Tsutsumi ...................... 358/474 |
| 7,123,386 | B2 | * | 10/2006 | Tanaka et al. ................ 358/474 |
| 7,466,461 | B2 | * | 12/2008 | Chen et al. .................... 358/474 |
| 7,694,963 | B2 | * | 4/2010 | Iwago et al. ............. 271/258.01 |
| 7,869,105 | B2 | * | 1/2011 | Ikeda ............................ 358/498 |
| 2013/0329265 | A1 | * | 12/2013 | Miyamoto .................... 358/496 |

* cited by examiner

*Primary Examiner* — Cheukfan Lee
(74) *Attorney, Agent, or Firm* — Kirton McConkie; Evan R. Witt

(57) ABSTRACT

An automatic document feeding scanning device including an automatic document feeder, a flatbed scanner and a power switching mechanism is provided. The automatic document feeder has a pickup arm and a feeding gear, the flatbed scanner has a scanning module and a scanning gear. When the scanning module is moved and the movement of the scanning module is obstructed to enable the scanning module to take a first reacting force, the power switching mechanism is disengaged from the scanning gear in response to the first reacting force and transfers a driving power to the automatic document feeder. When the pickup arm is swung and the swing of the pickup arm is obstructed to enable the pickup arm to take a second reacting force, the power switching mechanism is disengaged from the feeding gear in response to the second reacting force and transfers the driving power to the flatbed scanner.

10 Claims, 10 Drawing Sheets

AUTOMATIC DOCUMENT FEEDING SCANNING DEVICE

FIELD OF THE INVENTION

The present invention generally relates to a scanning device, and more particularly to an automatic document feeding scanning device with an automatic document feeder and a flatbed scanner.

BACKGROUND OF THE INVENTION

With the development of science and technology, the preservation manner for the document has evolved from filing a traditional paper document into saving a document as an electronic file, and a scanning device is an implement popularly utilized for document digitization, wherein the scanning device is capable of transforming the content of a paper document into an electronic file, which is more convenient to a user to disseminate, collect or save, by scanning.

The flatbed scanner, which is a kind of early scanning device, can only be used for scanning a single document every time as it is operated, and thus it is necessary to replace the single document onto the scanning platform. In another word, when the user desires to scan a plurality of documents as a plurality of images, it is necessary to repeatedly and manually replace the single document located on the scanning platform one by one until all of the plurality of documents is scanned. Since it is inconvenient to manually replace the document, an automatic document feeder has been developed and commercially available, which can be assembled with the flatbed scanner to form an automatic document feeding scanning device. Hence, it is capable of automatically feeding and scanning a plurality of documents one by one until all of the plurality of documents is scanned without manually replacing the plurality of documents.

The detail structure and the actual operation process of a conventional automatic document feeding scanning device are illustrated hereinafter. FIG. 1 illustrates a cross-sectional structural schematic side view of a conventional automatic document feeding scanning device. Referring to FIG. 1, the conventional automatic document feeding scanning device 1 comprises an automatic document feeder 10 and a flatbed scanner 11, wherein the automatic document feeder 10 comprises an inlet tray 101, an outlet tray 102, a pickup arm 103, a top cover 104, a feeding path 105, a plurality of feeding roller sets 106 and an outlet roller set 107. The flatbed scanner 11 is disposed under the automatic document feeder 10, which comprises a scanning module 111, a transmission roller set 112, a transmission belt 113, a scanning window 114 and a scanning platform 115.

In the automatic document feeder 10, the inlet tray 101 is capable of receiving at least one document S desired to be scanned, while the outlet tray 102 is located under the inlet tray 101, which is capable of receiving at least one document already scanned. The pickup arm 103 is located under the top cover 104 and located at an end of the feeding path 105, which can be swung relative to the top cover 104 and feed the document located on the inlet tray 101 into the feeding path 105. The feeding path 105 passes through the scanning window 114 of the flatbed scanner 11, which is capable of enabling the document to be transmitted through and toward the scanning window 114. The plurality of feeding roller sets 106 is disposed on the feeding path 105, and capable of feeding the document, so as to enable the document to be moved within the feeding path 105. The outlet roller set 107 is located at another end of the feeding path 105, wherein the document already transmitted through the scanning window 114 is capable of being fed toward the outlet tray 102 by the outlet roller set 107.

In the flatbed scanner 11, the transmission roller set 112 and the transmission belt 113 are both disposed under the scanning window 114 and the scanning platform 115. In addition, the transmission roller set 112 connects with the transmission belt 113, while the transmission belt connects with the scanning module 111. When the transmission roller set 112 is driven to rotate, the transmission roller set 112 brings the transmission belt 113 to rotate, so as to enable the transmission belt 113 to bring the scanning module 111 to move. When the user separately uses the flatbed scanner 11, it is necessary to put the document on the scanning platform 115 first. Afterwards, both of the transmission roller set 112 and the transmission belt 113 are operated and thus brings the scanning module 111 to move toward the right side of FIG. 1, so as to enable the scanning module 111 to be moved to a position under the scanning platform 115 and to be moved along the scanning platform 115, and thus to scan the document located on the scanning platform 115. After the scan is complete, both of the transmission roller set 112 and the transmission belt 113 are operated and thus brings the scanning module 111 to move toward the left side of FIG. 1 till the scanning module 111 is moved back to an initial position of the scanning module 111, i.e. the scanning module 111 is returned. The above mentioned description is about the actual operation process of the conventional flatbed scanner 11.

The actual operation process of the automatic document feeder 10 accompanied with the flatbed scanner 11 is illustrated hereinafter. As illustrated in FIG. 1, before the automatic document feeder 10 is operated, the pickup arm 103 thereof is located at a position near the top cover 104, so as to enable the user to put a plurality of documents on the inlet tray 101, and an end of the plurality of documents is located under the pickup arm 103. FIG. 2 illustrates a cross-sectional structural schematic side view of an automatic document feeder of a conventional automatic document feeding scanning device, wherein the automatic document feeder is operating. Referring to FIG. 2, when the automatic document feeder 10 is operated, the pickup arm 103 thereof is driven and thus swung relative to the top cover 104, and the pickup arm 103 is swung to a position to contact with the plurality of documents S, so as to feed one document of the plurality of documents S into the feeding path 105. Next, the document fed into the feeding path 105 is fed to the scanning window 114 by the plurality of feeding roller sets 106, and the scanning module 111 moved to the position under the scanning window 114 scans the document transmitted through the feeding path 105 via the scanning window. At this moment, both of the transmission roller set 112 and the transmission belt 113 are not operated, and the scanning module 111 is not moved. After whole of the document is completely scanned by the scanning module 111 and then fed to leave the scanning window 114, a next document of the plurality of documents S is subsequently fed into the feeding path 105 by the foregoing operation process as well, and then the scanned document is fed onto the outlet tray 102 by the outlet roller set 107. After all of the plurality of documents S is completely scanned and fed onto the outlet tray 102, the user can take the plurality of documents S out from the outlet tray 102. In addition, both of the transmission roller set 112 and the transmission belt 113 are operated, so as to enable the scanning module 111 to be returned, and then the scan of the plurality of documents S is completed.

According to the foregoing description, it is obvious to understood that, in order to separately obtain the driving power for achieving the foregoing feeding function and the foregoing scanning function, the automatic document feeder 10 and the flatbed scanner 11 should be respectively connected with different driving elements (not shown) during the automatic document feeding scanning device 1 operating. Generally speaking, there are a driving element and a gear set (not shown) disposed within the automatic document feeder 10, wherein the driving element connects with the pickup arm 103 for taking out the document, and the gear set connects with the driving element and the plurality of feeding roller sets 106, so as to enable the plurality of feeding roller sets 106 to obtain the driving power for feeding the document. In addition, there is another driving element disposed within the flatbed scanner 11, which connects with the transmission roller set 112 for moving the scanning module 111. However, it is not only much expensive to disposed the plurality of driving elements within the automatic document feeding scanning device, but also consuming more electricity by using the plurality of driving elements. In addition, there should be designed with a larger space in the automatic document feeding scanning device for containing the plurality of driving elements therein, and thus the total volume of the automatic document feeding scanning device is unavoidably increased. As a result, it is desired to provide an automatic document feeding scanning device unnecessary to dispose a plurality of driving elements therein.

SUMMARY OF THE INVENTION

The present invention is directed to providing an automatic document feeding scanning device unnecessary to dispose a plurality of driving elements therein.

In a preferred embodiment, the present invention provides an automatic document feeding scanning device capable of scanning a document, wherein the automatic document feeding scanning device comprises:
  an automatic document feeder, capable of feeding the document, and having a pickup arm, a top cover and a feeding gear, wherein the feeding gear connects with the pickup arm and is capable of being driven, so as to enable the pickup arm to feed the document into the automatic document feeder or to be swung relative to the top cover, while the top cover is disposed over the pickup arm;
  a flatbed scanner, disposed under the automatic document feeder, capable of scanning the document, and having a scanning module, an obstructing element and a scanning gear, wherein the scanning gear connects with the scanning module and capable of being driven, so as to enable the scanning module to be moved and thus to scan the document, while the obstructing element is disposed at a side of the scanning module and capable of obstructing the scanning module to be moved; and a power switching mechanism, disposed at a position near the automatic document feeder and the flatbed scanner, and capable of transmitting a driving power to the automatic document feeder or transmitting the driving power to the flatbed scanner, wherein the power switching mechanism comprises:
    a driving module, capable of providing the driving power and outputting the driving power; and
    a planet gear module, connecting with the driving module, and capable of engaging with the feeding gear and thus transmitting the driving power to the automatic document feeder, or engaging with the scanning gear and thus transmitting the driving power to the flatbed scanner, wherein the obstructing element provides a first reacting force to the scanning module and the planet gear module when a movement of the scanning module is obstructed by the obstructing element, so as to enable the planet gear module to be disengaged from the scanning gear, while the top cover provides a second reacting force to the pickup arm and the planet gear module when a swing of the pickup arm is obstructed, so as to enable the planet gear module to be disengaged from the feeding gear.

In a preferred embodiment, the driving module comprises:
  a driving element, capable of rotating and thus providing the driving power;
  a driving gear, connecting with the driving element, and capable of transmitting the driving power coming from the driving element; and
  a transmitting gear, engaging with the driving gear, connecting with the planet gear module, and capable of outputting the driving power to the planet gear module; wherein the driving gear rotates along a first rotating direction with the driving element and the transmitting gear rotates along a second rotating direction opposite to the first rotating direction when the driving element rotates along the first rotating direction; while the driving gear rotates along the second rotating direction with the driving element and the transmitting gear rotates along the first rotating direction when the driving element rotates along the second rotating direction.

In a preferred embodiment, the pickup arm is swung toward the top cover when the planet gear module engages with the feeding gear and the driving element rotates along the first rotating direction; while the pickup arm feeds the document into the automatic document feeder when the planet gear module engages with the feeding gear and the driving element rotates along the second rotating direction; the scanning module moves away from the obstructing element and scans the document when the planet gear module engages with the scanning gear and the driving element rotates along the first rotating direction; while the scanning module moves close to the obstructing element when the planet gear module engages with the scanning gear and the driving element rotates along the second rotating direction.

In a preferred embodiment, the driving element is a driving motor.

In a preferred embodiment, the planet gear module comprises:
  a swinging rod, connecting with a rotating shaft of the transmitting gear and capable of being swung relative to the rotating shaft;
  a sun gear, fitting onto the rotating shaft and located at a side of the swinging rod, and capable of being synchronously rotated with the rotating shaft;
  a first planet gear, disposed on the swinging rod and located at a side of the sun gear, so as to engage with the sun gear, capable of engaging with the scanning gear or engaging with the feeding gear, and brought to transmit the driving power to the scanning gear or the feeding gear by the sun gear;
  a second planet gear, disposed on a second end of the swinging rod and located at another side of the sun gear, so as to engage with the sun gear, and capable of being brought by the sun gear to rotate; and
  an auxiliary post, disposed on the flatbed scanner and located close to the second planet gear, having a plurality of sawtooth structures, and capable of engaging with the second planet gear when the first planet gear is disengaged from the scanning gear or the feeding gear.

In a preferred embodiment, the planet gear module comprises:

a swinging rod, connecting with the driving module and capable of being swung relative to the driving module;

a sun gear, connecting with driving module and located at a side of the swinging rod, and capable of being rotated in response to the driving power;

a first planet gear, disposed on the swinging rod and located at a side of the sun gear, so as to engage with the sun gear, capable of engaging with the scanning gear or engaging with the feeding gear, and brought to transmit the driving power to the scanning gear or the feeding gear by the sun gear;

a second planet gear, disposed on a second end of the swinging rod and located at another side of the sun gear, so as to engage with the sun gear, and capable of being brought by the sun gear to rotate; and an auxiliary post, disposed on the flatbed scanner and located close to the second planet gear, having a plurality of sawtooth structures, and capable of engaging with the second planet gear when the first planet gear of the planet gear module is disengaged from the scanning gear or the feeding gear.

In a preferred embodiment, the power switching mechanism further comprises a holding module disposed at a position near the swinging rod and contacting with a first end of the swinging rod, and the holding module comprises:

a holding rod, capable of contacting with the swinging rod and holding the first end of the swinging rod therein, wherein the holding rod has a first notch and a second notch located under the first notch, the first planet gear is kept engaging with the feeding gear when the first end of the swinging rod inserts into the first notch and is held therein, while the first planet gear is kept engaging with the scanning gear when the first end of the swinging rod inserts into the second notch and is held therein; and an elastic element, connecting with the holding rod, and capable of providing an elastic force to the holding rod, so as to enable the holding rod to be returned.

In a preferred embodiment, when the first planet gear is disengaged from the feeding gear and the swinging rod is swung in response to the second reacting force, the first end of the swinging rod is departed from the first notch and pushes the holding rod, and the second planet gear engages with the plurality of sawtooth structures, so as to enable the swinging rod to be swung toward the scanning gear relative to the driving module; while when the first planet gear is disengaged from the scanning gear and the swinging rod is swung in response to the first reacting force, the first end of the swinging rod is departed from the second notch and pushes the holding rod, and the second planet gear engages with the plurality of sawtooth structures, so as to enable the swinging rod to be swung toward the feeding gear relative to the driving module.

In a preferred embodiment, the pickup arm comprises a transmission shaft connecting with the feeding gear, so as to enable the driving power to be transmitted to the pickup arm via the feeding gear and the transmission shaft.

In a preferred embodiment, the flatbed scanner further comprises:

a transmission gear set, connecting with the scanning gear and capable of transmitting the driving power, wherein the transmission gear set comprises:

a first bevel gear, connecting with the scanning gear and synchronously rotating with the scanning gear; and a second bevel gear, engaging with the first bevel gear and brought to rotate by the first bevel gear; and a transmission belt, connecting with the second bevel gear and the scanning module, and capable of being brought to move the scanning module by the first bevel gear.

DETAILED DESCRIPTION OF THE PREFERRED EMBODIMENT

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 1:
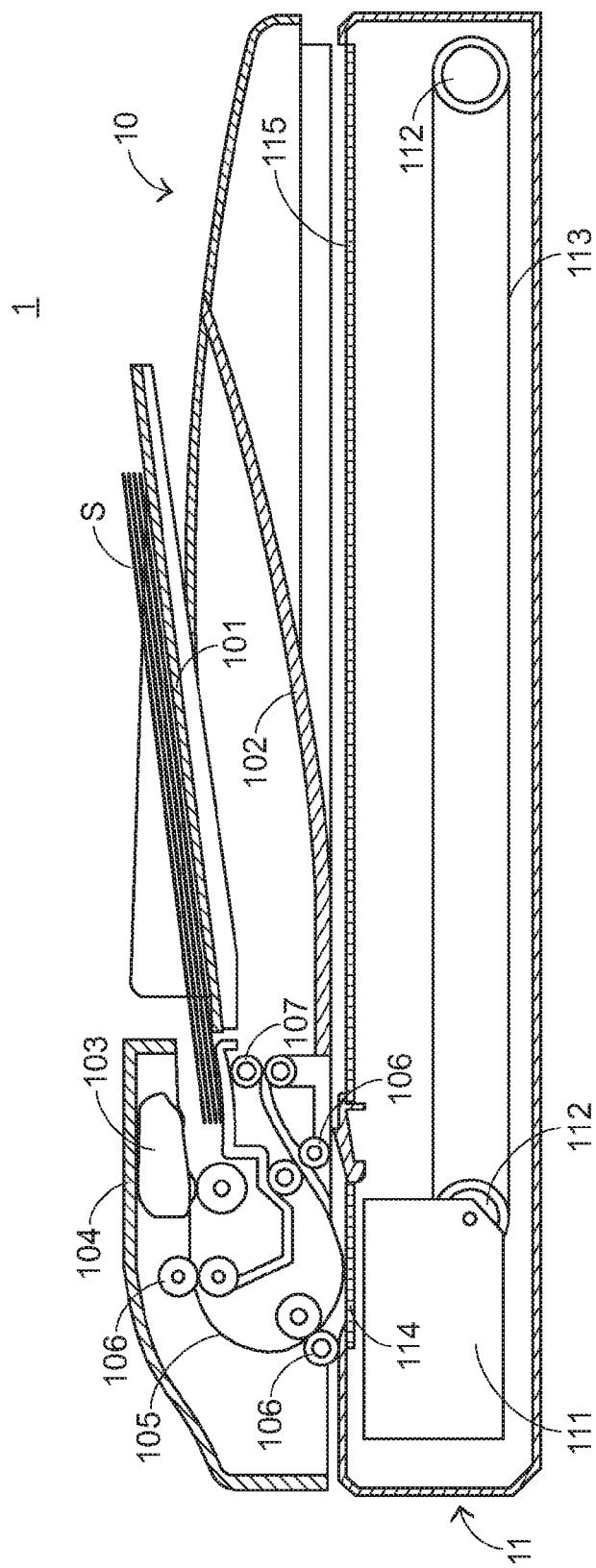
FIG. 1 illustrates a cross-sectional structural schematic side view of a conventional automatic document feeding scanning device.
Figure 2:
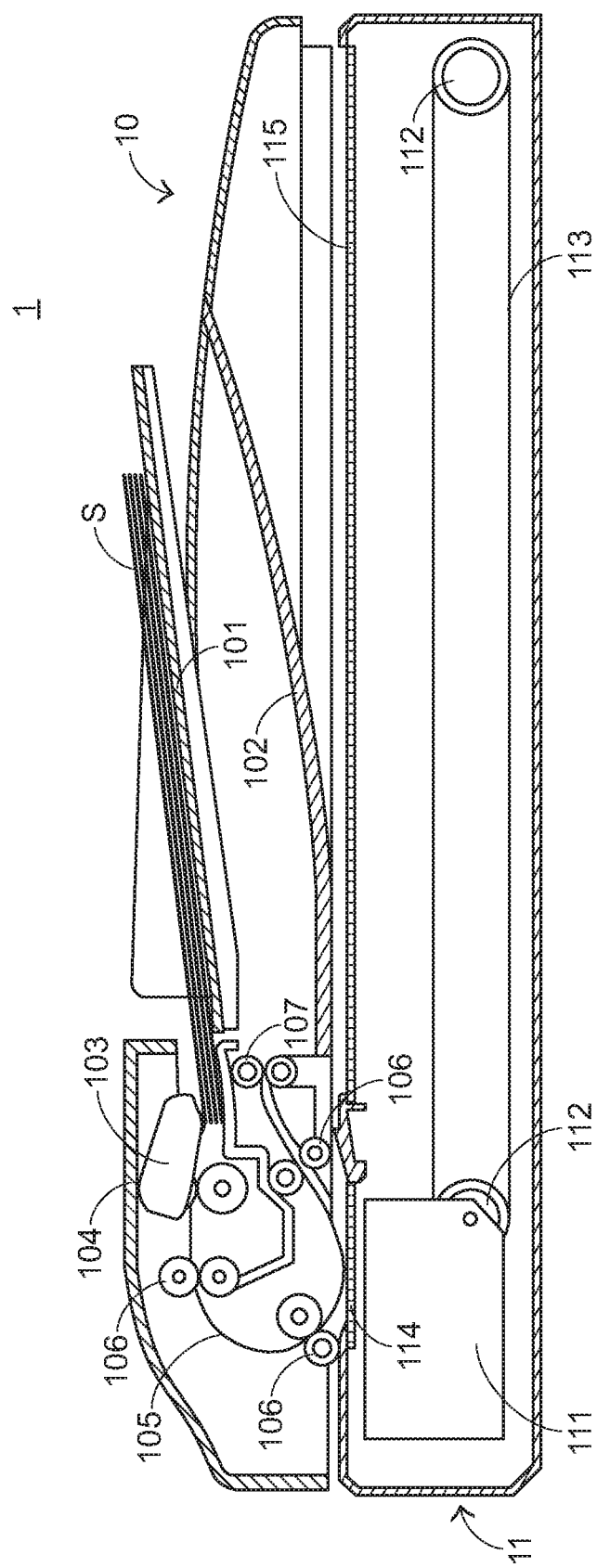
FIG. 2 illustrates a cross-sectional structural schematic side view of an automatic document feeder of a conventional automatic document feeding scanning device, wherein the automatic document feeder is operating.
Figure 3:
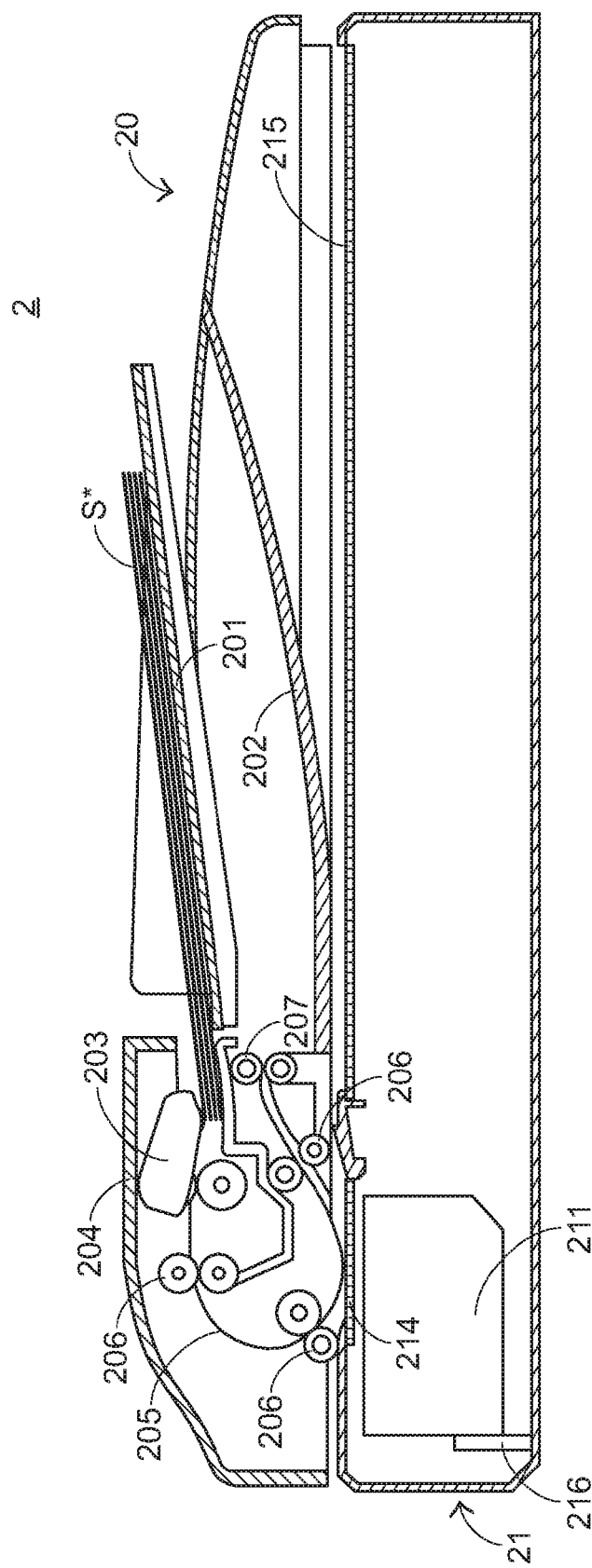
FIG. 3 illustrates a cross-sectional structural schematic side view of an automatic document feeding scanning device according to a preferred embodiment of the present invention.
Figure 4:
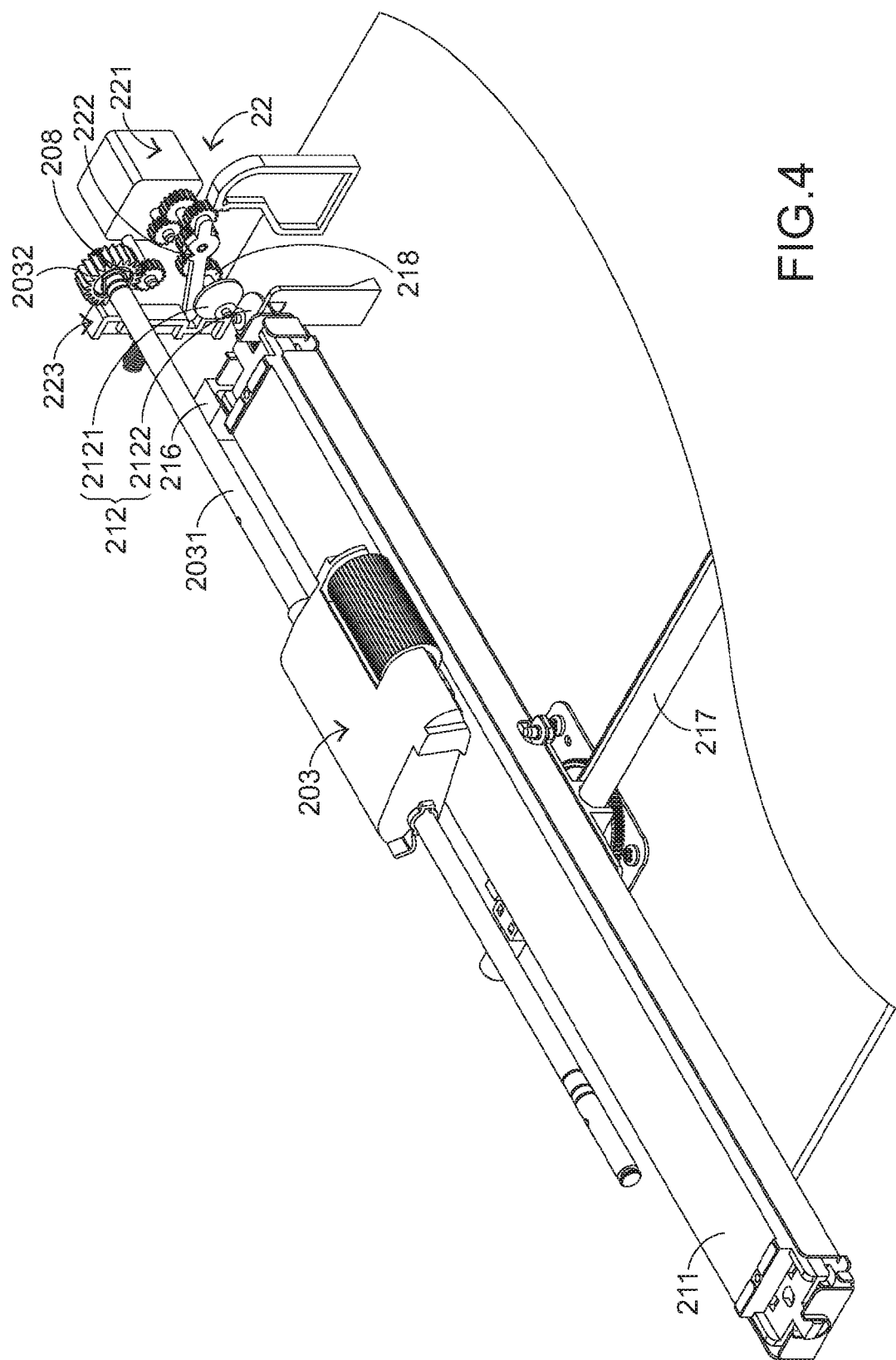
FIG. 4 illustrates a partial structural schematic view of an automatic document feeding scanning device according to a preferred embodiment of the present invention.
Figure 5:
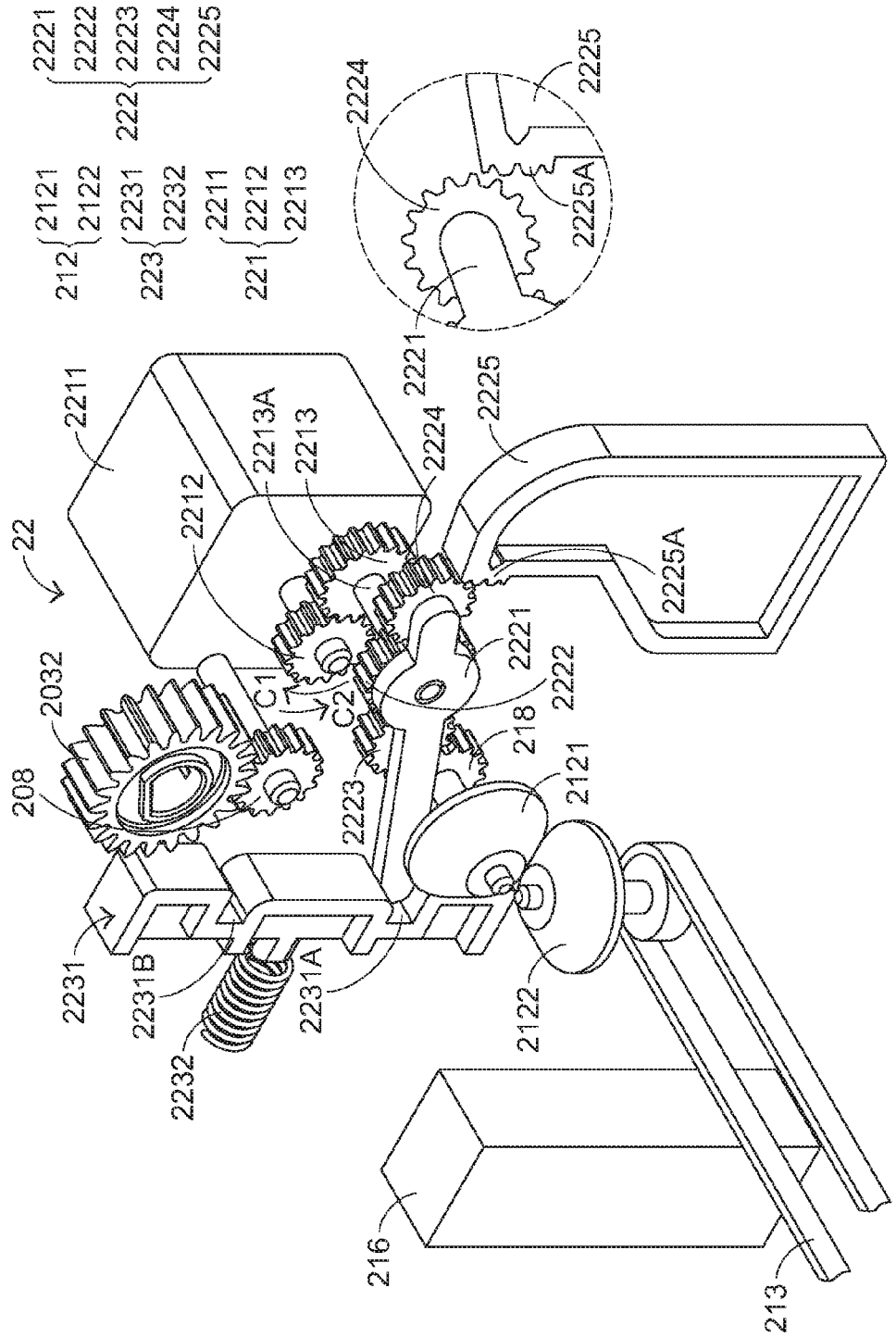
FIG. 5 illustrates a structural schematic view of a power switching mechanism of an automatic document feeding scanning device according to a preferred embodiment of the present invention, wherein the power switching mechanism is connecting with a scanning gear.

The present invention provides an automatic document feeding scanning device, which is capable of providing driving power to the automatic document feeder and the flatbed scanner respectively. Referring to FIG. 3 and FIG. 4 together, FIG. 3 illustrates a cross-sectional structural schematic side view of an automatic document feeding scanning device according to a preferred embodiment of the present invention, and FIG. 4 illustrates a partial structural schematic view of an automatic document feeding scanning device according to a preferred embodiment of the present invention. The automatic document feeding scanning device 2 is capable of scanning a document S*, which comprises an automatic document feeder 20, a flatbed scanner 21 and a power switching mechanism 22. Herein, the automatic document feeder 20 is capable of feeding the document S*, which comprises an inlet tray 201, an outlet tray 202, a pickup arm 203, a top cover 204, a feeding path 205, a plurality of feeding roller sets 206, an outlet roller set 207 and a feeding gear 208. The flatbed scanner 21 is disposed under the automatic document feeder 20 and capable of scanning the document S*, which comprises a scanning module 211, a transmission gear set 212, a transmission belt 213 (as shown in FIG. 5), a scanning window 214, a scanning platform 215, an obstructing element 216, a moving shaft 217 and a scanning gear 218. Some of the detail structures and the actual operation processes of the automatic document feeder 20 and the flatbed scanner 21 are substantially similar to those of the prior art and thus are omitted herein, while those different from the conventional automatic document feeding scanning device 1 will be illustrated later in detail.

FIG. 5 illustrates a structural schematic view of a power switching mechanism of an automatic document feeding scanning device according to a preferred embodiment of the present invention, wherein the power switching mechanism is connecting with a scanning gear. Hereinafter, referring to FIG. 4 and FIG. 5 together, the power switching mechanism 22 is disposed at a position near the automatic document feeder 20 and the flatbed scanner 21, and capable of transmitting a driving power to the automatic document feeder 20, or transmitting the driving power to the flatbed scanner 21. In addition, the power switching mechanism 22 comprises a driving module 221, a planet gear module 222 and a holding module 223. Herein, the driving module 221 is capable of providing the driving power and outputting the driving power to the planet gear module 222. Further, the planet gear module 222 connects with the driving module 221, and capable of engaging with the feeding gear 208 and thus transmitting the driving power to the automatic document feeder 20, or engaging with the scanning gear 218 and thus transmitting the driving power to the flatbed scanner 21. Besides, the he holding module 223 is disposed at a position near the planet gear module 222 and contacts with the planet gear module 222. As a result, the holding module 223 is capable of holding the planet gear module 222 when the planet gear module 222 engages with the feeding gear 208, so as to enable the planet gear module 222 not to be swung and kept engaging with the feeding gear 208, or holding the planet gear module 222 when the planet gear module 222 engages with the scanning gear 218, so as to enable the planet gear module 222 not to be swung and kept engaging with the scanning gear 218.

As illustrated in FIG. 4, the feeding gear 208 connects with the pickup arm 203 and is capable of being driven, so as to enable the pickup arm 203 to feed the document S* into the feeding path 205 of the automatic document feeder 20 or to be swung relative to the top cover 204, and the top cover 204 (as shown in FIG. 3) is disposed over the pickup arm 203. The pickup arm 203 comprises a transmission shaft 2031 and a connecting gear 2032, wherein the transmission shaft 2031 connects with the connecting gear 2032, and the connecting gear 2032 engages with the feeding gear 208, so as to enable the driving power to be transmitted to the pickup arm 203 via the feeding gear 208, the connecting gear 2032 and the transmission shaft 2031. In the flatbed scanner 21, the transmission gear set 212 thereof connects with the scanning gear 218, and is capable of transmitting the driving power coming from the driving module 221. In addition, the transmission gear set 212 comprises a first bevel gear 2121 and a second bevel gear 2122, wherein the first bevel gear 2121 connects with the scanning gear 218 and rotates with the scanning gear 218 synchronously, while the second bevel gear 2122 engages with the first bevel gear 2121 and is brought to rotate by the first bevel gear 2121. Moreover, the transmission belt 213 connects with the second bevel gear 2122 and the scanning module 211, and is capable of being brought to move the scanning module 211 by the first bevel gear 2121, so as to enable the scanning module 211 to move along the moving shaft 217. On the other hand, the obstructing element 216 of the flatbed scanner 21 is shown in both of FIG. 3 and FIG. 4, wherein the obstructing element 216 thereof is disposed at a side of the scanning module 211 and capable of obstructing the scanning module 211 to move along the moving shaft 217. In the present preferred embodiment, the obstructing element 216 is an obstructing plate formed from extending out of a bottom of the flatbed scanner 21.

Referring to FIG. 5 as well, the driving module 221 comprises a driving element 2211, a driving gear 2212 and a transmitting gear 2213. Herein, the driving element 2211 is capable of rotating and thus providing the driving power. In addition, the driving gear 2212 connects with the driving element 2211, and is capable of transmitting the driving power coming from the driving element 2211, while the transmitting gear 2213 engages with the driving gear 2212 and connects with the planet gear module 222, and is capable of outputting the driving power to the planet gear module 222. Moreover, the transmitting gear 2213 has a rotating shaft 2213A, and is capable of connecting with the planet gear module 22. In the present preferred embodiment, the driving element 2211 is a driving motor, and the rotating shaft 2213A is integrally formed with the transmitting gear 2213. As a result, the driving gear 2212 rotates along a first rotating direction C1 with the driving element 2211 and the transmitting gear 2213 rotates along a second rotating direction C2 opposite to the first rotating direction C1 when the driving element 2211 rotates along the first rotating direction C1. In another word, the rotating direction of the driving element 2211 is different from the rotating direction of the transmitting gear 2213. In another preferred embodiment, the driving module only comprises a driving element and a driving gear without disposing any transmitting gear therein. As a result, in such an embodiment, the driving element has a rotating shaft connecting with the planet gear module, so as to enable the driving module to connect with the planet gear module via the driving gear. In the other preferred embodiment, the driving module comprises a driving element, a driving gear and two transmitting gears. In such an embodiment, the second transmitting gear has a rotating shaft connecting with the planet gear module, and a rotating direction of the driving element is opposite to a rotating direction of the first transmitting gear but the same as a rotating direction of the second transmitting gear.

The planet gear module 222 comprises a swinging rod 2221, a sun gear 2222, a first planet gear 2223, a second planet gear 2224 and an auxiliary post 2225. Herein, the swinging rod 2221 connects with the rotating shaft 2213A of the transmitting gear 2213 and can be swung relative to the rotating shaft 2213A. In addition, the sun gear 2222 is fitting onto the rotating shaft 2213A, located at a side of the swinging rod 2221, and capable of rotating with the rotating shaft 2213A synchronously. Further, the planet gear 2224 is disposed on the swinging rod 2221 and located at a side of the sun gear 2222 to engage with the sun gear 2222. Moreover, the planet gear 2224 is capable of engaging with the scanning gear 218 or engaging with the feeding gear 208, and brought to transmit the driving power to the scanning gear 218 or to the feeding gear 208 by the sun gear 2222. The second planet gear 2224 is disposed on a second end of the swinging rod 2221, located at another side of the sun gear 2222 to engage with the sun gear 2222 and capable of being brought to rotate by the sun gear 2222. Further, the auxiliary post 2225 is disposed within the flatbed scanner 22 and located close to the second planet gear 2224, which has a plurality of sawtooth structures 2225A capable of engaging with the second planet gear 2224 when the planet gear 2223 is disengaged from the scanning gear 218 or the feeding gear 208, so as to enable the swinging rod 2221 to be swung relative to the rotating shaft 2213A due to the driving power coming from the driving module 221.

As illustrated in FIG. 5, the holding module 223 is disposed at a position near the swinging rod 2221 and contacts with a first end of the swinging rod 2221, and the holding module 223 comprises a holding rod 2231 and an elastic element 2232, wherein the holding rod 2231 is capable of contacting with the swinging rod 2221 and holding the first end of the swinging rod 2221 therein. In addition, the holding rod 2231 has a first notch 2231A and a second notch 2231B, and the second notch 2231B is located under the first notch 2231A, wherein the first planet gear 2223 is kept engaging with the feeding gear 208 when the first end of the swinging rod 2221 inserts into the first notch 2231A and is held therein, so as to prevent the first planet gear 2223 from disengaging from the feeding gear 208 and thus to keep transmitting the driving power. Similarly, the first planet gear 2223 is kept engaging with the scanning gear 218 when the first end of the swinging rod 2221 inserts into the second notch 2231B and is held therein, so as to prevent the first planet gear 2223 from disengaging from the scanning gear 218 and thus to keep transmitting the driving power. The elastic element 2232 connects with the holding rod 2231, and is capable of providing an elastic force to the holding rod 2231, so as to enable the holding rod 2231 to be returned. In the present preferred embodiment, the elastic element 2232 is a spiral spring.

The actual operation process of the power switching mechanism 22 is illustrated hereinafter. Referring to FIG. 3 and FIG. 5 together, FIG. 5 presents a case that the first planet gear 2223 of the power switching mechanism 22 engages with the scanning gear 218. In such a case, the first end of the swinging rod 2221 inserts into the second notch 2231B of the holding rod 2231 and is held therein, and the second planet gear 2224 does not contact with the auxiliary post 2225, i.e. the second planet gear 2224 does not engage with the plurality of sawtooth structures 2225A of the auxiliary post 2225. As the driving element 2211 rotates along the first rotating direction C1, the driving gear 2212 rotates along the first rotating direction C1 and thus brings both of the transmitting gear 2213 and the rotating shaft 2213A to rotate along the second rotating direction C2. At the same time, both of the sun gear 2222 and the rotating shaft 2213A synchronously rotate along the second rotating direction C2, and thus bring the first planet gear 2223 to rotate along the first rotating direction C1. As a result, the scanning gear 218 is enabled to rotate along the second rotating direction C2, and both of the first bevel gear 2121 and the scanning gear 218 synchronously rotate along the second rotating direction C2 as well. In addition, the second bevel gear 2122 engaging with the first bevel gear 2121 is brought to rotate along the first rotating direction C1, and thus the transmission belt 213 is brought by the second bevel gear 2122, so as to bring the scanning module 211 to move along the moving shaft 217 toward a direction away from the obstructing element 216 (i.e. the right side of FIG. 3). At the same time, the scanning module 211 scans the document S* along the scanning platform 215.

When the scanning module 211 completely scans the document S* and the driving element 2211 is reversed and thus rotate along the second rotating direction C2, the driving gear 2212 rotates along the second rotating direction C2 with the driving element 2211 and thus brings both of the transmitting gear 2213 and the rotating shaft 2213A to rotate along the first rotating direction C1. At the same time, both of the sun gear 2222 and the rotating shaft 2213A synchronously rotate along the first rotating direction C1, and thus brings the first planet gear 2223 to rotate along the second rotating direction C2, so as to enable the scanning gear 218 to rotate along the first rotating direction C1, and enable both of the first bevel gear 2121 and the scanning gear 218 to synchronously rotate along the first rotating direction C1. In addition, the second bevel gear 2122 engaging with the first bevel gear 2121 is brought to rotate along the second rotating direction C2, and thus the transmission belt 213 is brought by the second bevel gear 2122, so as to bring the scanning module 211 to move along the moving shaft 217 toward a direction close to the obstructing element 216 (i.e. the left side of FIG. 3), i.e. the scanning module 211 is returned.

Figure 6:
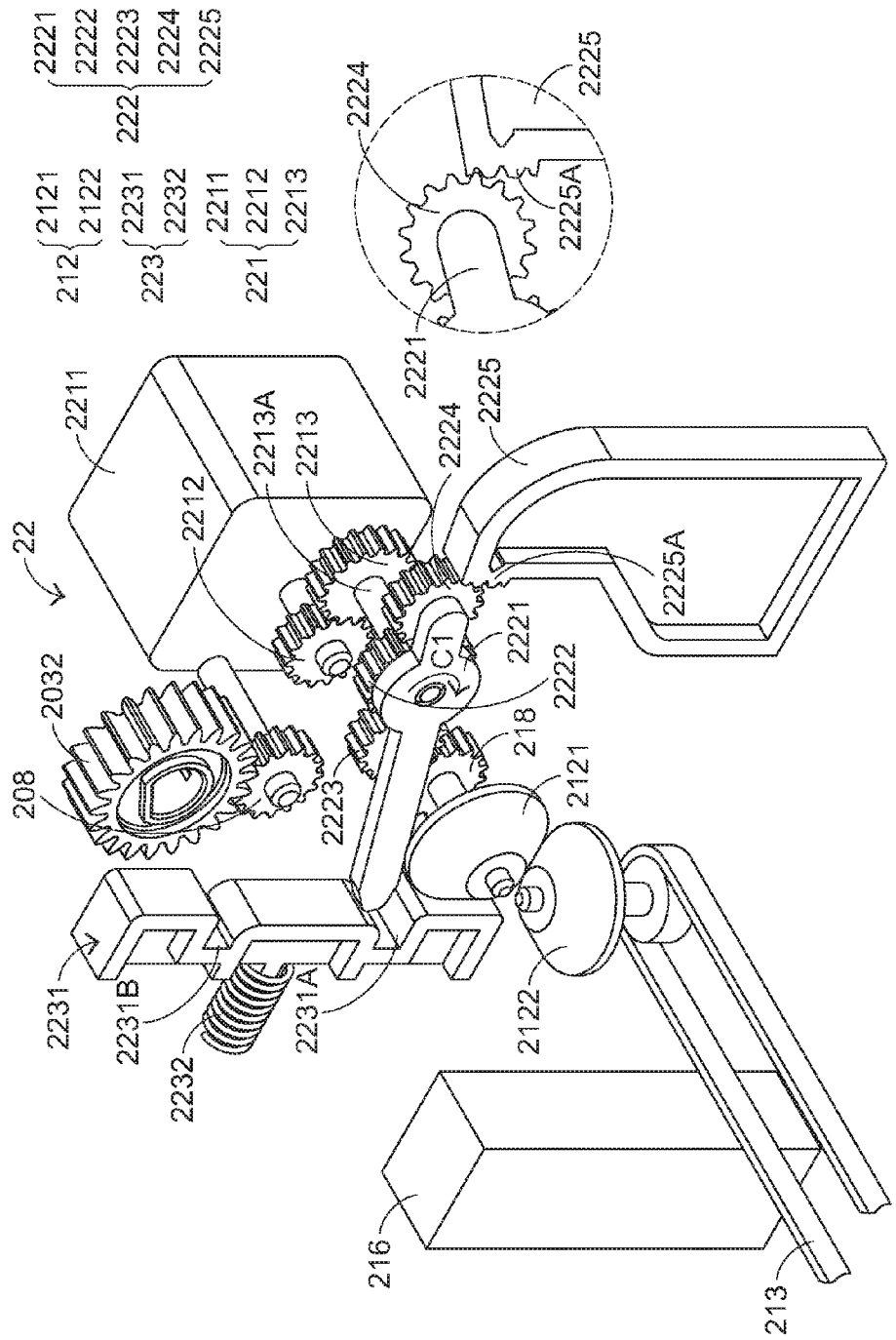
FIG. 6 illustrates a structural schematic view of a swinging rod of an automatic document feeding scanning device according to a preferred embodiment of the present invention, wherein the swinging rod is departed from a second notch.
Figure 7:
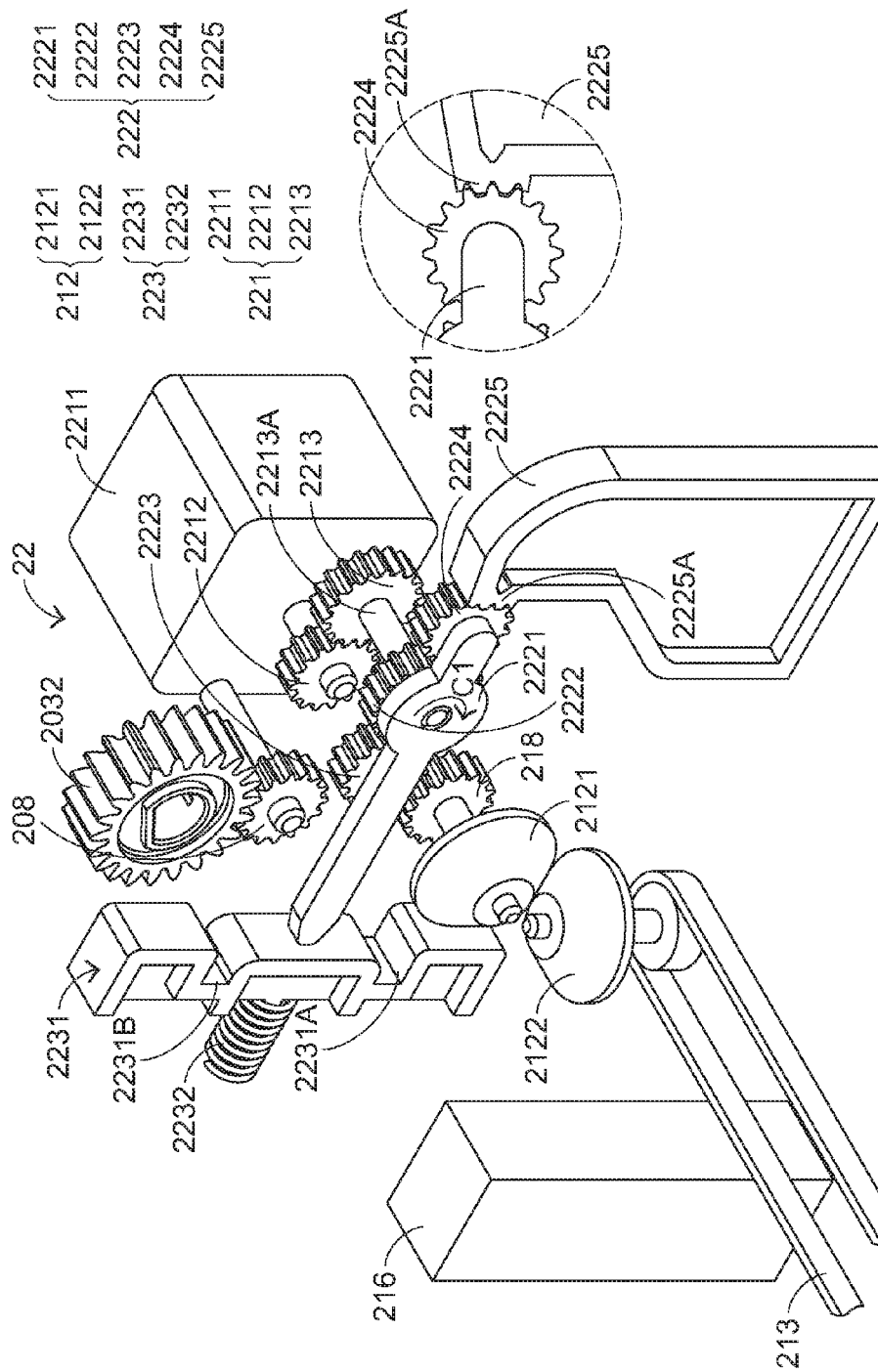
FIG. 7 illustrates a structural schematic view of a swinging rod of an automatic document feeding scanning device according to a preferred embodiment of the present invention, wherein the swinging rod is swung toward a feeding gear.
Figure 8:
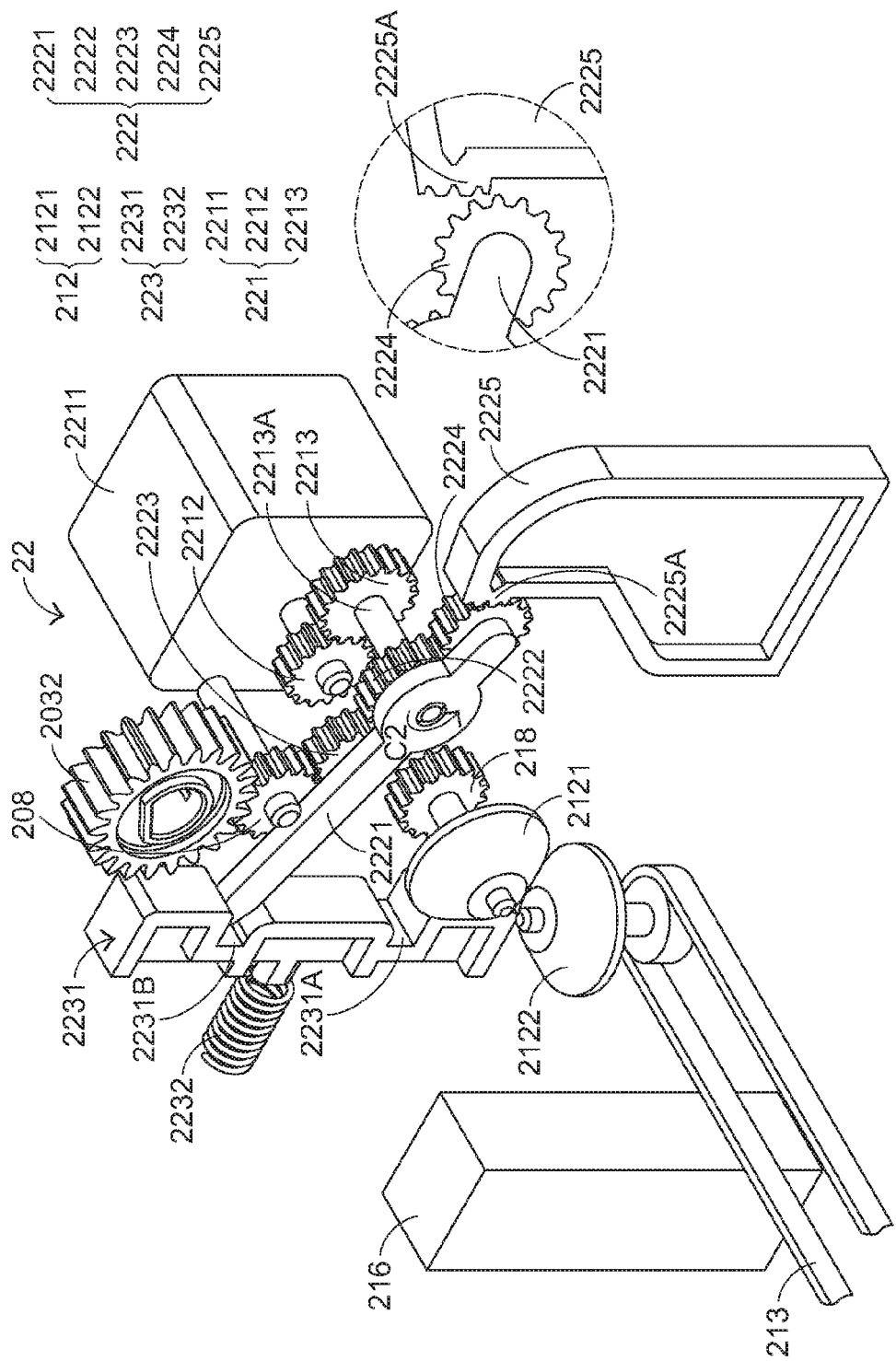
FIG. 8 illustrates a structural schematic view of a power switching mechanism of an automatic document feeding scanning device according to a preferred embodiment of the present invention, wherein the power switching mechanism is connecting with a feeding gear.
Figure 9:
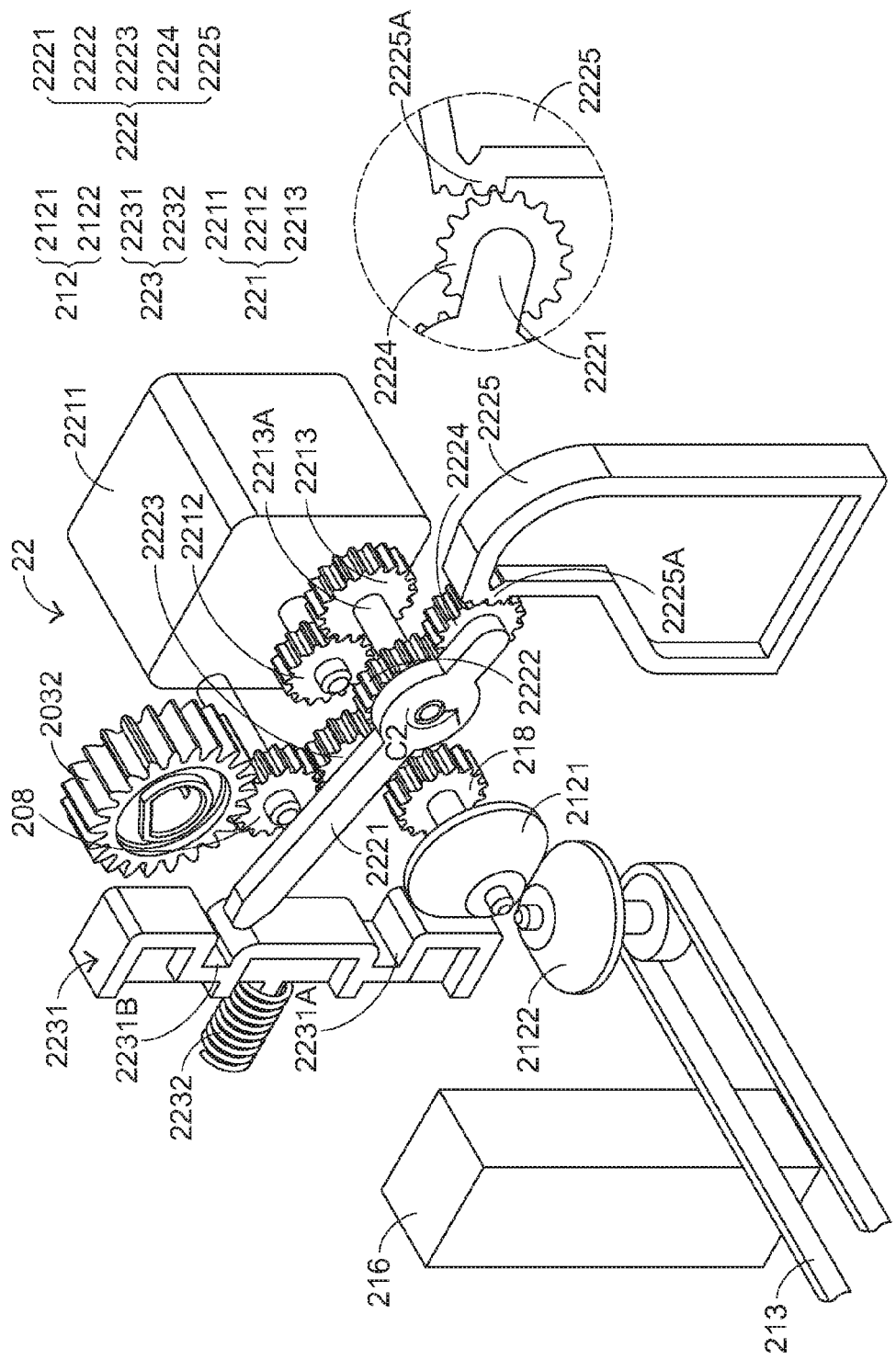
FIG. 9 illustrates a structural schematic view of a swinging rod of an automatic document feeding scanning device according to a preferred embodiment of the present invention, wherein the swinging rod is departed from a first notch.
Figure 10:
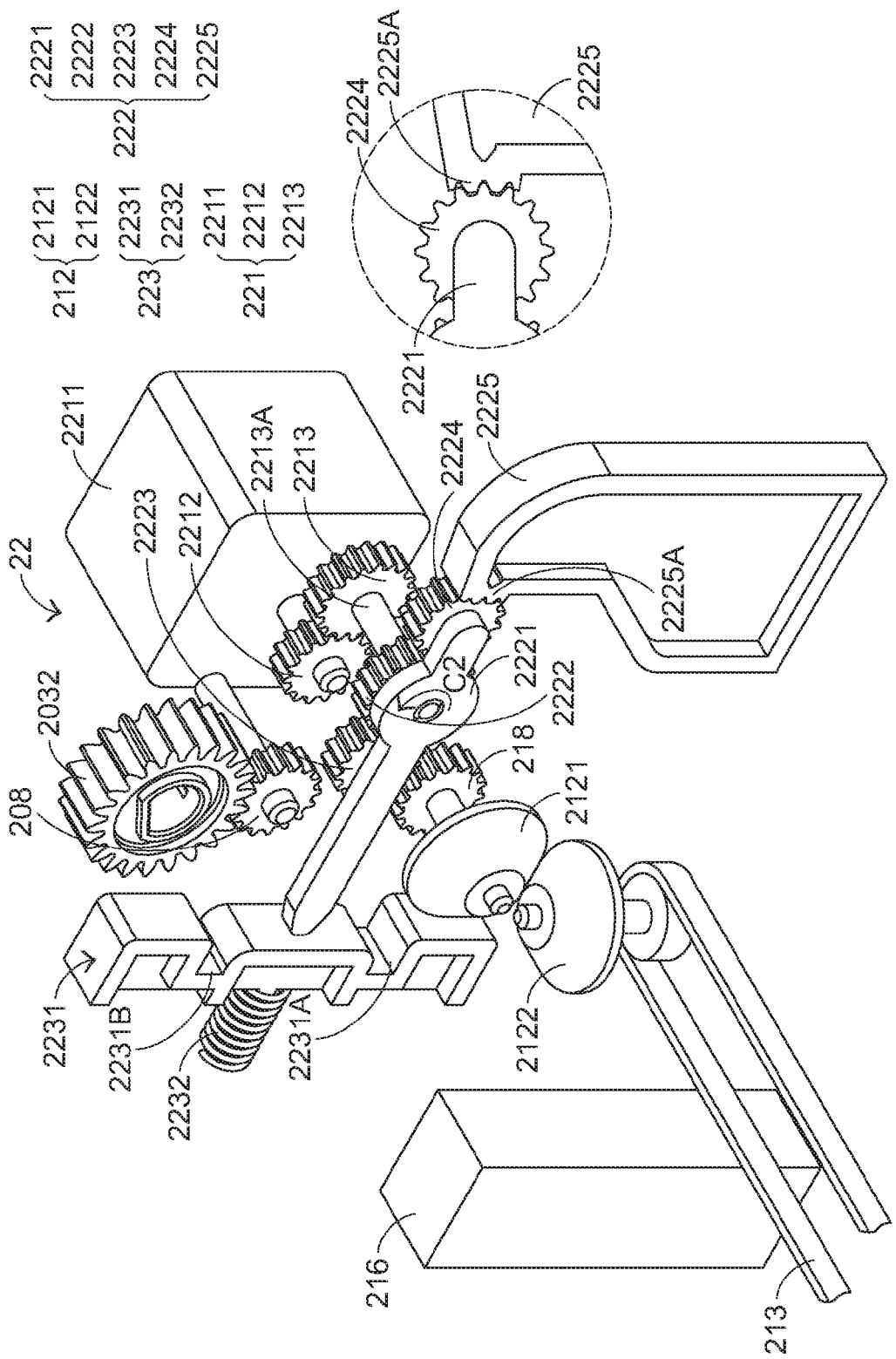
FIG. 10 illustrates a structural schematic view of a swinging rod of an automatic document feeding scanning device according to a preferred embodiment of the present invention, wherein the swinging rod is swung toward a scanning gear.

FIG. 6 illustrates a structural schematic view of a swinging rod of an automatic document feeding scanning device according to a preferred embodiment of the present invention, wherein the swinging rod is departed from a second notch. In addition, FIG. 7 illustrates a structural schematic view of a swinging rod of an automatic document feeding scanning device according to a preferred embodiment of the present invention, wherein the swinging rod is swung toward a feeding gear. Furthermore, FIG. 8 illustrates a structural schematic view of a power switching mechanism of an automatic document feeding scanning device according to a preferred embodiment of the present invention, wherein the power switching mechanism is connecting with a feeding gear. Moreover, FIG. 9 illustrates a structural schematic view of a swinging rod of an automatic document feeding scanning device according to a preferred embodiment of the present invention, wherein the swinging rod is departed from a first notch. Besides, FIG. 10 illustrates a structural schematic view of a swinging rod of an automatic document feeding scanning device according to a preferred embodiment of the present invention, wherein the swinging rod is swung toward a scanning gear. Next, referring to FIG. 5 and FIG. 6 together, when the scanning module 211 moves to contact with the obstructing element 216 and is obstructed by the obstructing element 216, the scanning module 211 obtains the driving power and thus provides a first acting force to the obstructing element 216 since the driving gear 2212 keeps rotating along the second rotating direction C2 even if the scanning module 211 is obstructed. As a result, the obstructing element 216 generates a first reacting force to the scanning module 211 and the planet gear module 222. In such a case, the swinging rod 2221 of the planet gear module 222 is swung and thus disengaged from the scanning gear 218 in response to the first reacting force, so as to enable the first end of the swinging rod 2221 to depart from the second notch 2231B. In addition, the first end of the swinging rod 2221 lightly pushes the holding rod 2231, so as to enable the holding rod 2231 to move to compress the elastic element 2232, and thus the elastic element 2232 gathers the elastic force as illustrated in FIG. 6.

When the swinging rod 2221 is swung in response to the first reacting force, the second planet gear 2224 located on the second end of the swinging rod 2221 engages with the plurality of sawtooth structures 2225A of the auxiliary post 2225 in response to a swing of the swinging rod 2221. In such a case, the auxiliary post 2225 is formed as a pivot point when the swinging rod 2221 swinging. Since the sun gear 2222 rotates toward the first rotating direction C1, the second planet gear 2224 rotates toward the second rotating direction C2 accordingly, so as to enable the swinging rod 2221 to be swung toward the feeding gear 208. In addition, the first end of the swinging rod 2221 keeps pushing the holding rod 2231, so as to enable the holding rod 2231 to move and thus to continuously compressing the elastic element 2232. As a result, the elastic element 2232 continuously gathers the elastic force as illustrated in FIG. 7.

When the swinging rod 2221 keeps being swung toward the feeding gear 208 and the first planet gear 2223 on the swinging rod 2221 engages with the feeding gear 208, the first end of the swinging rod 2221 moves to the front of the first notch 2231A of the holding rod 2231, and the first end of the swinging rod 2221 stops pushing the holding rod 2231, so as to enable the elastic element 2232 to release the elastic force to the holding rod 2231, and thus the holding rod 2231 is returned. At the same time, in response to the holding rod 2231 being returned, the first notch 2231A thereof encloses the first end of the swinging rod 2221, so as to enable the first end of the swinging rod 2221 to insert into the first notch 2231A and thus to hold the first end of the swinging rod 2221 within the first notch 2231A as shown in FIG. 8. As a result, the driving power provided by the driving module 221 is switched from transmitting to the flatbed scanner 21 into transmitting to the automatic document feeder 20 by the power switching mechanism 22.

As illustrated in FIG. 8, since the first planet gear 2223 engages with the feeding gear 208 and the driving gear 2212 keeps rotating toward the second rotating direction C2, the pickup arm 203 is swung relative to the top cover 204 toward the direction away from the top cover 204 and thus contacts with the document S* located on the inlet tray 201, so as to feed the document S* into the feeding path 205 of the automatic document feeder 20 and enable the scanning module 211 to scan the document S* passing through the scanning window 214.

Next, after the document S* located on the inlet tray 201 fed into the feeding path 205, i.e. there has no document S* existed on the inlet tray 201 anymore, the driving gear 2212 is reversed and thus rotates along the first rotating direction C1, so as to enable the transmission shaft 2031 of the pickup arm 203 to be reversed. As a result, the pickup arm 203 is swung relative to the top cover 204 toward the direction close to the top cover 204, i.e. the pickup arm 203 is away from the feeding path 205. When the pickup arm 203 is swung relative to the top cover 204 and is obstructed by the top cover 204, the pickup arm 203 obtains the driving power and thus provides a second acting force to the top cover 204 since the driving gear 2212 keeps rotating along the first rotating direction C1 even if the pickup arm 203 is obstructed. As a result, the top cover 204 generates a second reacting force to the pickup arm 203 and the planet gear module 222. In such a case, the swinging rod 2221 of the planet gear module 222 is swung and thus disengaged from the feeding gear 208 in response to the second reacting force, so as to enable the first end of the swinging rod 2221 to depart from the first notch 2231A. In addition, the first end of the swinging rod 2221 lightly pushes the holding rod 2231, so as to enable the holding rod 2231 to move to compress the elastic element 2232, and thus the elastic element 2232 gathers the elastic force as illustrated in FIG. 9.

When the swinging rod 2221 is swung in response to the first reacting force, the second planet gear 2224 located on the second end of the swinging rod 2221 engages with the plurality of sawtooth structures 2225A of the auxiliary post 2225 in response to a swing of the swinging rod 2221. In such a case, the auxiliary post 2225 is formed as a pivot point when the swinging rod 2221 swinging. Since the sun gear 2222 rotates toward the second rotating direction C2, the second planet gear 2224 rotates toward the first rotating direction C1 accordingly, so as to enable the swinging rod 2221 to be swung toward the feeding gear 208. In addition, the first end of the swinging rod 2221 keeps pushing the holding rod 2231, so as to enable the holding rod 2231 to move and thus to continuously compressing the elastic element 2232. As a result, the elastic element 2232 continuously gathers the elastic force as illustrated in FIG. 10.

When the swinging rod 2221 keeps being swung toward the scanning gear 218 and the first planet gear 2223 on the swinging rod 2221 engages with the scanning gear 218, the first end of the swinging rod 2221 moves to the front of the second notch 2231B of the holding rod 2231, and the first end of the swinging rod 2221 stops pushing the holding rod 2231, so as to enable the elastic element 2232 to release the elastic force to the holding rod 2231, and thus the holding rod 2231 is returned. At the same time, in response to the holding rod 2231 being returned, the second notch 2231B thereof encloses the first end of the swinging rod 2221, so as to enable the first end of the swinging rod 2221 to insert into the second notch 2231B and thus to hold the first end of the swinging rod 2221 within the second notch 2231B as shown in FIG. 5. As a result, the driving power provided by the driving module 221 is switched from transmitting to the automatic document feeder 20 into transmitting to the flatbed scanner 21 by the power switching mechanism 22, wherein the scanning process processed by the flatbed scanner 21 is substantially the same as the foregoing description and is omitted herein.

It should be noted that although the present preferred embodiment illustrates that the first rotating direction C1 is the clockwise direction and the second rotating direction C2 is the counterclockwise direction, the present preferred embodiment does not intend to limit that the swinging rod 2221 is swung toward the scanning gear 218 when the driving element 2211 rotates along the first rotating direction C1 and the swinging rod 2221 is swung toward the feeding gear 208 when the driving element 2211 rotates along the second rotating direction C2. In fact, both of the rotating direction of the driving element and the swinging direction of the swinging rod can be varied in response to not only the number of the gear but also the connection manner of the gear disposed in both of the driving module and the planet gear module. As a result, in the other preferred embodiment, the swinging rod can also be designed as to be swung toward the feeding gear when the driving element rotates toward the first rotating direction.

According to the foregoing illustrations, it should be understood that the automatic document feeding scanning device of the present invention is disposed with only a driving element used for transmitting the driving power to the automatic document feeder or the flatbed scanner based upon the control of the power switching mechanism. In detail, when the flatbed scanner is operated and the scanning module thereof is moved and obstructed by the obstructing element, the scanning module generates a first reacting force to the power switching mechanism, so as to enable the power switching mechanism to be disengaged from the scanning gear and to transfer the driving power to the automatic document feeder in response to the driving power generated by the driving element accompanied with the structure of the power switching mechanism. And vice versa is the same as well, when the automatic document feeder is operated and the pickup arm thereof is swung and obstructed by the top cover thereof, the pickup arm generates a second reacting force to the power switching mechanism, so as to enable the power switching mechanism to be disengaged from the feeding gear and to transfer the driving power to the flatbed scanner in response to the driving power generated by the driving element accompanied with the structure of the power switching mechanism. As a result, the automatic document feeding scanning device of the present invention can provide the driving power to the automatic document feeder or the flatbed scanner by merely using a single driving element, and thus it can not only reduce the purchase cost but also consume less power by using fewer driving elements. Certainly, the overall volume of the automatic document feeding scanning device of the present invention can be reduced as well since the requirement of the internal space of the automatic document feeding scanning device is decreased by disposing fewer driving elements therein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An automatic document feeding scanning device, capable of scanning a document, wherein the automatic document feeding scanning device comprises:
    an automatic document feeder, capable of feeding the document, and having a pickup arm, a top cover and a feeding gear, wherein the feeding gear connects with the pickup arm and is capable of being driven, so as to enable the pickup arm to feed the document into the automatic document feeder or to be swung relative to the top cover, while the top cover is disposed over the pickup arm;
    a flatbed scanner, disposed under the automatic document feeder, capable of scanning the document, and having a scanning module, an obstructing element and a scanning gear, wherein the scanning gear connects with the scanning module and capable of being driven, so as to enable the scanning module to be moved and thus to scan the document, while the obstructing element is disposed at a side of the scanning module and capable of obstructing the scanning module to be moved; and
    a power switching mechanism, disposed at a position near the automatic document feeder and the flatbed scanner, and capable of transmitting a driving power to the automatic document feeder or transmitting the driving power to the flatbed scanner, wherein the power switching mechanism comprises:
        a driving module, capable of providing the driving power and outputting the driving power; and
        a planet gear module, connecting with the driving module, and capable of engaging with the feeding gear and thus transmitting the driving power to the automatic document feeder, or engaging with the scanning gear and thus transmitting the driving power to the flatbed scanner, wherein the obstructing element provides a first reacting force to the scanning module and the planet gear module when a movement of the scanning module is obstructed by the obstructing element, so as to enable the planet gear module to be disengaged from the scanning gear, while the top cover provides a second reacting force to the pickup arm and the planet gear module when a swing of the pickup arm is obstructed, so as to enable the planet gear module to be disengaged from the feeding gear.

2. The automatic document feeding scanning device as claimed in claim 1, wherein the driving module comprises:
    a driving element, capable of rotating and thus providing the driving power;
    a driving gear, connecting with the driving element, and capable of transmitting the driving power coming from the driving element; and
    a transmitting gear, engaging with the driving gear, connecting with the planet gear module, and capable of outputting the driving power to the planet gear module; wherein the driving gear rotates along a first rotating direction with the driving element and the transmitting gear rotates along a second rotating direction opposite to the first rotating direction when the driving element rotates along the first rotating direction; while the driving gear rotates along the second rotating direction with the driving element and the transmitting gear rotates along the first rotating direction when the driving element rotates along the second rotating direction.

3. The automatic document feeding scanning device as claimed in claim 2, wherein the pickup arm is swung toward the top cover when the planet gear module engages with the feeding gear and the driving element rotates along the first rotating direction; while the pickup arm feeds the document into the automatic document feeder when the planet gear module engages with the feeding gear and the driving element rotates along the second rotating direction; the scanning module moves away from the obstructing element and scans the document when the planet gear module engages with the scanning gear and the driving element rotates along the first rotating direction; while the scanning module moves close to the obstructing element when the planet gear module engages with the scanning gear and the driving element rotates along the second rotating direction.

4. The automatic document feeding scanning device as claimed in claim 2, wherein the driving element is a driving motor.

5. The automatic document feeding scanning device as claimed in claim 2, wherein the planet gear module comprises:
    a swinging rod, connecting with a rotating shaft of the transmitting gear and capable of being swung relative to the rotating shaft;
    a sun gear, fitting onto the rotating shaft and located at a side of the swinging rod, and capable of being synchronously rotated with the rotating shaft;
    a first planet gear, disposed on the swinging rod and located at a side of the sun gear, so as to engage with the sun gear, capable of engaging with the scanning gear or engaging with the feeding gear, and brought to transmit the driving power to the scanning gear or the feeding gear by the sun gear;
    a second planet gear, disposed on a second end of the swinging rod and located at another side of the sun gear, so as to engage with the sun gear, and capable of being brought by the sun gear to rotate; and
    an auxiliary post, disposed on the flatbed scanner and located close to the second planet gear, having a plurality of sawtooth structures, and capable of engaging with the second planet gear when the first planet gear is disengaged from the scanning gear or the feeding gear.

6. The automatic document feeding scanning device as claimed in claim 1, wherein the planet gear module comprises:
   a swinging rod, connecting with the driving module and capable of being swung relative to the driving module;
   a sun gear, connecting with driving module and located at a side of the swinging rod, and capable of being rotated in response to the driving power;
   a first planet gear, disposed on the swinging rod and located at a side of the sun gear, so as to engage with the sun gear, capable of engaging with the scanning gear or engaging with the feeding gear, and brought to transmit the driving power to the scanning gear or the feeding gear by the sun gear;
   a second planet gear, disposed on a second end of the swinging rod and located at another side of the sun gear, so as to engage with the sun gear, and capable of being brought by the sun gear to rotate; and
   an auxiliary post, disposed on the flatbed scanner and located close to the second planet gear, having a plurality of sawtooth structures, and capable of engaging with the second planet gear when the first planet gear of the planet gear module is disengaged from the scanning gear or the feeding gear.

7. The automatic document feeding scanning device as claimed in claim 6, wherein the power switching mechanism further comprises a holding module disposed at a position near the swinging rod and contacting with a first end of the swinging rod, and the holding module comprises:
   a holding rod, capable of contacting with the swinging rod and holding the first end of the swinging rod therein, wherein the holding rod has a first notch and a second notch located under the first notch, the first planet gear is kept engaging with the feeding gear when the first end of the swinging rod inserts into the first notch and is held therein, while the first planet gear is kept engaging with the scanning gear when the first end of the swinging rod inserts into the second notch and is held therein; and
   an elastic element, connecting with the holding rod, and capable of providing an elastic force to the holding rod, so as to enable the holding rod to be returned.

8. The automatic document feeding scanning device as claimed in claim 7, wherein when the first planet gear is disengaged from the feeding gear and the swinging rod is swung in response to the second reacting force, the first end of the swinging rod is departed from the first notch and pushes the holding rod, and the second planet gear engages with the plurality of sawtooth structures, so as to enable the swinging rod to be swung toward the scanning gear relative to the driving module; while when the first planet gear is disengaged from the scanning gear and the swinging rod is swung in response to the first reacting force, the first end of the swinging rod is departed from the second notch and pushes the holding rod, and the second planet gear engages with the plurality of sawtooth structures, so as to enable the swinging rod to be swung toward the feeding gear relative to the driving module.

9. The automatic document feeding scanning device as claimed in claim 1, wherein the pickup arm comprises a transmission shaft connecting with the feeding gear, so as to enable the driving power to be transmitted to the pickup arm via the feeding gear and the transmission shaft.

10. The automatic document feeding scanning device as claimed in claim 1, wherein the flatbed scanner further comprises:
   a transmission gear set, connecting with the scanning gear and capable of transmitting the driving power, wherein the transmission gear set comprises:
      a first bevel gear, connecting with the scanning gear and synchronously rotating with the scanning gear; and
      a second bevel gear, engaging with the first bevel gear and brought to rotate by the first bevel gear; and
   a transmission belt, connecting with the second bevel gear and the scanning module, and capable of being brought to move the scanning module by the first bevel gear.

\* \* \* \* \*